United States Patent [19]
Burg et al.
[11] 4,195,158
[45] Mar. 25, 1980

[54] PROCESS FOR THE PREPARATION OF GRANULAR OXYMETHYLENE POLYMERS HAVING IMPROVED MECHANICAL PROPERTIES

[75] Inventors: Karlheinz Burg, Wiesbaden; Alwin Heller, Erzhausen; Hans-Dieter Sabel, Schwalbach; Helmut Schlaf, Kelkheim; Günter Sextro, Wiesbaden, all of Fed. Rep. of Germany

[73] Assignee: Hoechst Aktiengesellschaft, Frankfurt am Main, Fed. Rep. of Germany

[21] Appl. No.: 931,985

[22] Filed: Aug. 8, 1978

[30] Foreign Application Priority Data

Aug. 10, 1977 [DE] Fed. Rep. of Germany ....... 2735946

[51] Int. Cl.[2] ............................................ C08G 2/28

[52] U.S. Cl. .................................. 528/230; 528/270; 528/481; 528/496; 528/503

[58] Field of Search .............. 528/230, 270, 481, 496, 528/503

[56] References Cited

U.S. PATENT DOCUMENTS

| | | | |
|---|---|---|---|
| 3,505,292 | 4/1970 | Smith et al. | 528/270 |
| 4,046,738 | 9/1977 | Sextro et al. | 528/230 |

*Primary Examiner*—Lucille M. Phynes
*Attorney, Agent, or Firm*—Curtis, Morris & Safford

[57] ABSTRACT

Oxymethylene polymers (POM) are obtained in a granular form, by cooling a POM solution or dispersion, whose temperature is above the sintering temperature of the POM, to a temperature slightly below the sintering temperature of the POM, and extracting from the suspension obtained only those POM particles which show a grain diameter of more than 70 μm. As solvent or dispersing agent as well as precipitating and cooling agent there is used a mixture of methanol and water with a methanol content of at least 75% by weight. The POM obtained is suitable as engineering plastic material for the manufacture of shaped articles having improved mechanical properties.

3 Claims, No Drawings

PROCESS FOR THE PREPARATION OF GRANULAR OXYMETHYLENE POLYMERS HAVING IMPROVED MECHANICAL PROPERTIES

The present invention relates to a process for the preparation of granular oxymethylene polymers having improved mechanical properties.

The preparation of oxymethylene polymers (POM) by copolymerization of formaldehyde or cyclic oligomers of formaldehyde, especially 1,3,5-trioxane, with suitable comonomers, especially cyclic ethers or cyclic acetals, has already been proposed (cf. U.S. Pat. Nos. 3,027,352 and 3,803,094). It has further been described that granular oxymethylene polymers are obtained by introducing a solution of oxymethylene polymers into a precipitating agent having a temperature just below the sintering temperature of the oxymethylene polymer (cf. U.S. Pat. No. 3,371,066).

It has further been proposed to prepare granular oxymethylene polymers containing besides oxymethylene units from 0.1 to 20% by weight of oxyalkylene units having from 2 to 8 adjacent carbon atoms in the main chain, by introducing a 3 to 35% by weight solution or a fine dispersion of an oxymethylene polymer in a methanol/water mixture having a methanol content of at least 75% by weight, the temperature of which solution or dispersion being from 5° to 65° C. above the sintering temperature of the oxymethylene polymer, into a methanol/water mixture acting as cooling agent and having a methanol content of at least 75% by weight, which agent is kept in turbulent motion and at a temperature of from 1° to 10° C. below the sintering temperature of the oxymethylene polymer, in which process the amount of the precipitated oxymethylene polymer in the suspension formed is at most 25% by weight, and the granular oxymethylene polymer obtained is subsequently separated and dried (cf. German Offenlegungsschrift No. 2,508,886).

The present invention provides a further embodiment of the latter process and comprises separating the granular oxymethylene polymer particles with a grain diameter of more than 70 μm obtained by precipitation and drying the same. The invention further relates to granular oxymethylene polymers which have been prepared according to the above-mentioned process.

By oxymethylene polymers according to the invention there are to be understood poly(oxymethylenes) containing in the main valence chain besides oxymethylene units from 0.1 to 20, preferably from 0.5 to 10% by weight of oxyalkylene units having from 2 to 8, preferably 2, 3 or 4 adjacent carbon atoms; oxymethylene polymers having a portion of from 0.7 to 5% by weight of oxyalkylene units are especially suitable.

The oxymethylene polymers are prepared in known manner by polymerization of the monomers in bulk, suspension or solution in the presence of cationically active catalysts, for example at a temperature of from 0° to 100° C., preferably of from 50° to 90° C. (cf. U.S. Pat. No. 3,020,352). The cationically active catalysts which can be used are:

(1) protonic acids, for example perchloric acid, (2) esters of protonic acids, especially esters of perchloric acid with aliphatic alcohols of low molecular weight, for example perchloric acid tertiary butyl ester, (3) anhydrides of protonic acids, especially mixed anhydrides of perchloric acid and an aliphatic carboxylic acid of low molecular weight, for example acetyl perchlorate, (4) Lewis acids, especially halides of boron, tin, titanium, phosphorus, arsenic and antimony, for example boron trifluoride, tin tetrachloride, titanium tetrachloride, phosphorus pentachloride, phosphorus pentafluoride, arsenic pentafluoride and antimony pentafluoride, and (5) complex compounds or salt-like compounds of Lewis acids, preferably etherates or onium salts, for example boron trifluoride diethyletherate, boron trifluoride-di-n-butyletherate, triethyloxonium tetrafluoroborate, trimethyloxonium hexafluorophosphate, triphenylmethyl hexafluoroarsenate, acetyltetrafluoroborate, acetylhexafluorophosphate and acetylhexafluoroarsenate.

The quantity of the catalysts used in the copolymerization depends primarily on their efficiency and is generally from 0.1 to 2,000, preferably from 0.2 to 500 ppm, calculated on the total quantity of the compounds to be polymerized. Very efficient catalysts such as boron trifluoride are advantageously used in an amount of from 10 to 150, preferably of from 20 to 100 ppm, calculated on the total quantity of the compounds to be polymerized. The corresponding molar quantities should be used for complex compounds or salt-like compounds. Highly active catalysts such as perchloric acid are used in an amount of from 0.2 to 10, preferably of from 0.3 to 5 ppm.

It is generally advisable to use the catalysts in a diluted form. Gaseous catalysts are diluted with an inert gas, for example, nitrogen or a noble gas such as argon, whereas liquid or solid catalysts are dissolved in an inert solvent. Suitable solvents are especially aliphatic or cycloaliphatic hydrocarbons as well as nitrated aliphatic or aromatic hydrocarbons, for example, cyclohexane, methylene chloride, ethylene chloride, nitromethane and nitrobenzene. The weight ratio of catalyst to diluent is usually from 1:5 to 1:10,000, preferably from 1:10 to 1:100. Very strongly acting catalysts are advantageously diluted in a proportion of from 1:5,000 to 1:20,000.

The polymerization is preferably effected in an inert gas atmosphere with the exclusion of moisture; suitable inert gases are preferably noble gases such as argon, and nitrogen.

Suitable compounds copolymerizable with trioxane especially include (a) cyclic ethers having 3, 4 or 5 ring members, preferably epoxides, (b) cyclic acetals, preferably formals, having from 5 to 11, preferably 5, 6, 7 or 8 ring members, and (c) linear polyacetals, preferably polyformals.

Suitable comonomers for trioxane are especially compounds of the formula

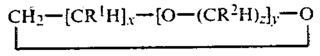

wherein (A) $R^1$ and $R^2$ are identical or different and represent each a hydrogen atom, an aliphatic alkyl radical having from 1 to 6, preferably 1, 2, 3 or 4 carbon atoms, or a phenyl radical, and (a) x is 1, 2 or 3 and y is zero, or (b) x is zero, y is 1, 2 or 3 and z is 2, or (c) x is zero, y is 1 and z is 3, 4, 5 or 6, or (B) $R^1$ is an alkoxymethyl radical having from 2 to 6, preferably 2, 3 or 4 carbon atoms, or a phenoxymethyl radical, x being 1 and y being zero and $R^1$ having the meaning given above.

Suitable cyclic ethers include, for example, ethylene oxide, propylene oxide, styrene oxide, cyclohexene oxide, oxacyclobutane and phenylglycidyl ether, and suitable cyclic formals are, for example, 1,3-dioxolane, 1,3-dioxane, 1,3-dioxepane and 1,3,6-trioxocane as well as 4-methyl-1,3-dioxolane, 4-phenyl-1,3-dioxolane, 1,3-dioxonane and 1,3-dioxacycloheptene-(5). Suitable linear polyformals include especially poly(1,3-dioxolane) and poly(1,3-dioxepane).

For preparing oxymethylene polymers having a molecular weight in a specific range the polymerization is advantageously carried out in the presence of a regulator. For this purpose there may be used especially formaldehyde dialkylacetals having from 3 to 9, preferably 3, 4 or 5 carbon atoms, for example formaldehyde dimethylacetal, diethylacetal, dipropylacetal and dibutylacetal, as well as aliphatic alcohols of low molecular weight, preferably alkanols having from 1 to 4 carbon atoms, for example, methanol, ethanol, propanol and butanol. The regulator is generally used in an amount of up to 0.5% by weight, preferably of from 0.005 to 0.1% by weight, calculated on the total quantity of the compounds to be polymerized.

In order to remove instable portions, the oxymethylene polymers are subjected advantageously to a controlled thermal partial degradation yielding primary terminal alcohol groups (cf. U.S. Pat. Nos. 3,174,948; 3,219,623 and 3,666,714). The thermal treatment is performed at a temperature of from 130° to 200° C., preferably of from 140° to 190° C., especially under non-acid conditions in aqueous/methanolic solution, advantageously in the presence of a compound showing a basic reaction, for example a tertiary aliphatic amine of low molecular weight, such as triethyl amine or triethanol amine, or a secondary alkali metal phosphate such as disodium hydrogen phosphate. A temperature of from 150° to 180° C. is especially advantageous. The length of time of the thermal treatment depending on the temperature goes from 10 seconds to 2 hours, preferably from 1 minute to 60 minutes. The higher the temperature, the shorter the residence time. At a temperature of 180° C. about 1 to 2 minutes are sufficient, about 5 to 10 minutes at a temperature of 160° C., about 10 to 30 minutes at a temperature of 150° C. and about 20 to 60 minutes at a temperature of 140° C. The treatment is preferably carried out under substantial exclusion of oxygen.

As starting material for the process according to the invention there is used a solution or dispersion of an oxymethylene polymer containing from 3 to 35, preferably 5 to 30% by weight of polymer. A polymer solution or dispersion containing from 10 to 20% by weight of oxymethylene polymer gives especially good results.

As solvent or dispersing agent there is used a methanol/water mixture having a methanol content of at least 75% by weight; a mixture consisting of from 99.9 to 80% by weight of methanol and of from 0.1 to 20% by weight of water is used preferably. A mixture consisting of from 99.5 to 85% by weight of methanol and of from 0.5 to 15% by weight of water is especially advantageous, and the best results are obtained when using a mixture consisting of from 99 to 90% by weight of methanol and of from 1 to 10% by weight of water.

The temperature of the solution or dispersion is 5 to 65, preferably 10° to 60° C. above the sintering temperature of the oxymethylene polymer, a temperature range of from 25° to 55° C. above the sintering temperature being especially advantageous.

As cooling agent and precipitating agent there is also used a mixture of methanol and water, the proportion of the components of which being in the same range as the aforesaid solvent or dispersing agent. The cooling agent has a temperature of from 1 to 10, preferably of from 1 to 5, especially of from 2° to 4° C. below the sintering temperature of the oxymethylene polymer. The quantity of the precipitated oxymethylene polymer in the suspension formed by introducing the polymer solution or dispersion is at most 25, preferably in the range of from 5 to 15% by weight.

The methanol used within the scope of the present invention may contain up to 30, preferably up to 10% by weight of organic impurities soluble in methanol, usually formed as by-products in the synthesis of oxymethylene polymers, for example formaldehyde, cyclic oligomers of formaldehyde, methylal, glycol, glycol formal, glycol monomethyl ether, glycol dimethyl ether as well as aliphatic alcohols of low molecular weight, aliphatic esters of low molecular weight and acetone.

The sintering temperature ($T_S$) is the temperature at which the solid polymer particles suspended in the methanol/water mixtures soften at the surface and stick together, without completely melting. It depends on the composition and the molecular weight of the polymer as well as on the nature of the solvent or dispersing agent. The sintering temperature of the oxymethylene polymers used according to the invention is in the range of from 100 to 140, especially of from 125° to 130° C.

The process of the invention may be carried out, for example, in an autoclave provided with a stirrer. The cooling and precipitating agent is given into this autoclave and the solution or dispersion of the oxymethylene polymer is introduced advantageously through a heated immersion pipe or a nozzle into the precipitating agent, the latter being kept in turbulent motion by stirring. The process may be carried out discontinuously or continuously; in the continuous method the polymer suspension obtained is withdrawn at the bottom of the autoclave at the same rate at which the solution or dispersion as well as an optional additional precipitating agent are added. The average residence time of the oxymethylene polymer in the precipitation vessel is in the range of from 1 minute to 12 hours, preferably of from 2 to 120 minutes. The pressure is in the range of from 5 to 40, preferably of from 8 to 30 bars depending on the temperature used in each case.

In the cooling of the POM solution or dispersion, solid polymer particles having a different grain size are formed by precipitation or agglomeration. The main amount of the POM particles obtained consists of granular particles having a grain diameter of more than 70 μm, whereas a small amount consists of fine-grained particles having a grain diameter of preferably less than 50 μm (sieve analysis). The granular particles show preferably a grain diameter of from 100 to 1,000 μm and especially from 150 to 400 μm. The amount of the fine-grained product to be separated is generally less than 20% by weight, calculated on the total amount of solid polymer particles; the fine-grained portion is preferably less than 15 and especially from 3 to 10% by weight.

From the suspension obtained by cooling, which is optionally further cooled to a temperature of less than 100° C., preferably to a temperature of from 20° to 60° C., the POM particles with a particle diameter of more than 70 μm are separated by common separating processes, for example, by filtration, centrifugation or decantation. From the remaining mixture, the POM particles having a particle diameter of more than 70 μm can be eliminated by means of a separator, and the solvent may be used again as liquid cooling agent. The separated oxymethylene polymer is finally dried at a temperature of from 20° to 135° C., preferably from 50° to 120° C. Drying under an inert gas atmosphere, for example under a noble gas or nitrogen atmosphere, is recommended. It is also possible to separate the total amount of solid polymer particles from the liquid and to effect the separation according to particle size during or after drying, for example by air separation or sifting.

The granular oxymethylene polymers obtained according to the invention are macromolecular: their reduced specific viscosity (RSV) is in the range of from 0.3 to 2.0, preferably of from 0.5 to 1.5 dl/g (measured with a 0.5% by weight solution of the polymer in γ-butyrolactone, containing 2% by weight of diphenylamine as stabilizer, at a temperature of 140° C.). The crystallite melting points of the oxymethylene polymers are in the range of from 140° to 180° C., their melt indices (MFI 190/2) are in the range of from 0.1 to 50, preferably of from 1 to 30 g/10 minutes (measured according to DIN=German Industrial Standard No. 53,735 at a temperature of 190° C. under a load of 2.16 kg). The apparent density of the granular oxymethylene polymers obtained according to the invention is generally more than 300 g/l, preferably of from 350 to 550 g/l (measured with the polymer dried at a temperature of 70° C. under nitrogen after having been mixed homogeneously for 2 minutes in a laboratory fluid mixer at a speed of 3,000 revolutions per minute). The RSV values of the separated fine-grained products are less than 0.3 dl/g and are preferably in the range of from 0.05 to 0.25 and especially from 0.1 to 0.2 dl/g.

The oxymethylene polymers obtained according to the invention may be stabilized additionally against the action of heat, oxygen and/or light by mixing them homogeneously with stabilizers. Homogenization is usually carried out in a commercial mixing device, for example, an extruder, at a temperature above the melting point of the polymer up to 250° C., preferably of from 180° to 210° C. The total amount of the added stabilizers is in the range of from 0.1 to 10, preferably of from 0.5 to 5% by weight, calculated on the total mixture.

As stabilizers there are especially useful bisphenol compounds, alkaline earth metal salts of carboxylic acids as well as guanidine compounds. The bisphenol compounds used are preferably esters of monobasic 4-hydroxyphenylalkanoic acids which are substituted in the nucleus once or twice by an alkyl radical having from 1 to 4 carbon atoms and which have from 7 to 13, preferably 7, 8 or 9 carbon atoms, with aliphatic di-, tri- or tetrahydric alcohols having from 2 to 6, preferably 2, 3 or 4 carbon atoms. Examples are esters of ω-(3-tertiary butyl-4-hydroxyphenyl)-pentanoic acid, β-(3-methyl-5-tertiary butyl-4-hydroxyphenyl)-propionic acid, (3,5-di-tertiary butyl-4-hydrophenyl) acetic acid, β-(3,5-di-tertiary butyl-4-hydroxyphenyl)-propionic acid or (3,5-di-isopropyl-4-hydroxyphenyl)-acetic acid with ethylene glycol, propane diol-(1,2), propane diol-(1,3), butane diol-(1,4), hexane diol-(1,6), 1,1,1-trimethylol ethane or pentaerythritol.

Suitable alkaline earth metal salts of carboxylic acids are especially alkaline earth metal salts of aliphatic, preferably hydroxyl groups containing mono-, bi- or tribasic carboxylic acids having from 2 to 20, preferably from 3 to 9 carbon atoms, for example the calcium or magnesium salts of stearic acid, ricinoleic acid, lactic acid, mandelic acid, malic acid or citric acid.

Suitable guanidine compounds are compounds of the formula

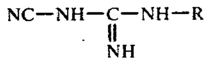

wherein R is a hydrogen atom, a cyano group or an alkyl radical having from 1 to 6 carbon atoms, for example cyanoguanidine, N-cyano-N'-methyl-guanidine, N-cyano-N'-ethyl-guanidine, N-cyano-N'-isopropyl-guanidine, N-cyano-N'-tertiary butylguanidine or N,N'-dicyanoguanidine. The guanidine compound is used optionally in an amount of from 0.01 to 1, preferably of from 0.02 to 0.5% by weight, calculated on the total mixture.

In addition there may be added to the oxymethylene polymer prepared according to the invention known light stabilizers, for example derivatives of benzophenone, acetophenone or triazine. Further usual additives, for example dyestuffs, pigments, reinforcing materials and fillers or nucleating agents may also be used.

The oxymethylene polymers obtained according to the invention show improved mechanical properties, especially toughness properties, as compared with known oxymethylene polymers. They may be processed by all methods usually employed for thermoplastics, for example by injection moulding, extrusion, blowing of extruded material, melt spinning and deep drawing. They are suitable for preparing semi-finished products and finished products such as shaped articles, for example bars, rods, plates, ribbons, bristles, threads, fibers, films, sheets, tubes and flexible tubes, as well as household articles, for example dishes and cups, and machine elements such as casings and gear wheels. They are especially suitable as engineering plastics for preparing dimensionally stable and true to shape articles.

The following Examples serve to illustrate the invention. In this connection "%" means in each case "percent by weight" and "parts" means "parts by weight".

EXAMPLES 1 to 9

Different parts of a copolymer of 98% of trioxane and 2% of ethylene oxide having a RSV value of 0.76 or 0.81 dl/g and a MFI value (190/2) of 9 or 7 g/10 minutes are mixed under a nitrogen atmosphere with 100 parts of a methanol/water mixture containing 500 ppm of triethylamine. The mixture obtained is heated for 5 minutes to a temperature of 170° C., whereupon the polymer is dissolved.

This solution is passed within 30 minutes through an immersion pipe into 30 parts of a methanol/water mixture of the same composition contained in an autoclave and being kept in turbulent motion and at a temperature of 125° C. (Example 2: 129° C.). At a sintering temperature of the polymer of 127° C. (Example 2: 131° C.), the temperature of the precipitating agent is consequently 2° C. below said sintering temperature. After another 10 minutes the suspension obtained is cooled to room temperature.

Further details and results may be seen from the following Table.

TABLE

| | Starting Polymer | | Solvent (= precipitating agent) | Polymer A (comparison) | | Polymer B (invention) | | | Polymer C (fine-grained) | |
|---|---|---|---|---|---|---|---|---|---|---|
| Example | RSV (dl/g) | conc. in solution (% by weight) | methanol/water (% by weight) | RSV (dl/g) | height of fall (cm) | RSV (dl/g) | height of fall (cm) | apparent density (g) | RSV (dl/g) | portion (% by weight) |
| 1 | 0.76 | 15 | 80/20 | 0.74 | 115 | 0.79 | 160 | 310 | 0.23 | 17 |
| 2 | 0.76 | 15 | 95/5 | 0.76 | 110 | 0.81 | 140 | 430 | 0.11 | 8 |
| 3 | 0.76 | 7.5 | 90/10 | 0.75 | 110 | 0.81 | 155 | 320 | 0.22 | 19 |
| 4 | 0.76 | 10 | 90/10 | 0.75 | 105 | 0.78 | 150 | 350 | 0.18 | 15 |
| 5 | 0.76 | 15 | 90/10 | 0.77 | 100 | 0.80 | 140 | 370 | 0.17 | 12 |
| 6 | 0.76 | 20 | 90/10 | 0.74 | 110 | 0.78 | 145 | 370 | 0.21 | 11 |
| 7 | 0.76 | 25 | 90/10 | 0.72 | 110 | 0.80 | 145 | 360 | 0.14 | 7 |
| 8 | 0.76 | 30 | 90/10 | 0.73 | 105 | 0.79 | 160 | 390 | 0.09 | 11 |
| 9 | 0.81 | 10 | 90/10 | 0.80 | 95 | 0.83 | 145 | 340 | 0.18 | 17 |

One half of the suspension is passed over a finely porous filter which permits a quantitative separation of the portion of solid matter (polymer A). The remaining second half of the suspension is separated by centrifuging by means of a sieve centrifuge (sieve mesh 70 μm) into solid matter portions with a particle diameter of more than 70 μm (polymer B) and smaller (polymer C, in the filtrate). From the centrifuged suspension, the finely divided polymer C is then eliminated with the aid of a separator.

The drying of the products A and B is effected at 70° C. under a nitrogen atmosphere. Thereafter the apparent density and RSV values of the dried products are determined. Part of the products are subsequently mixed with stabilizers (0.1% of dicyano-diamide; 0.5% of bis(2-hydroxy-3-tert. butyl-5-methyl-phenyl)-methane) and are then processed by injection molding to give test samples.

The impact properties are tested according to DIN 53 443 in the drop hammer test. For this purpose there are used square plates having a side length of 60 mm and a thickness of 2 mm as well as a drop hammer with a weight of 100 g; the ring opening of the supporting surface is 25 mm, which is different from the standard. The height of fall determined is a measure for the impact strength of the material.

What is claimed is:

1. A process for preparing a granular oxymethylene polymer adapted to be molded into articles having good impact strength which comprises preparing a polymer consisting essentially of oxymethylene units and from 0.1 to 20% by weight of oxyalkylene units having from 2 to 8 adjacent carbon atoms in the main chain, introducing said copolymer into a methanol/water solvent mixture having a methanol content of at least 75% by weight to form a solution or dispersion of said polymer at a temperature 5° to 65° C. above the sintering temperature of said polymer, mixing said solution or dispersion with a cooling agent which is a methanol/water solvent mixture having a methanol content of at least 75% by weight at a temperature of 1° to 10° C. below the sintering temperature of said polymer to form a granular polymer precipitate comprising up to 25% by weight of the mixture of solution or dispersion and cooling agent, isolating those particles of the precipitated polymer having a grain diameter of more than 70 microns and drying them.

2. Process as claimed in claim 1, wherein the separated and dried particles show a grain diameter of from 100 to 1,000 μm.

3. Granular oxymethylene polymer, which has been prepared according to the process as claimed in claim 1.

* * * * *